US012688554B2

(12) United States Patent
Lee

(10) Patent No.: US 12,688,554 B2
(45) Date of Patent: Jul. 21, 2026

(54) IMAGE CAPTURING DEVICE AND ZOOMING METHOD FOR DEPTH-OF-FIELD IMAGE THEREOF

(71) Applicant: ASUSTeK COMPUTER INC., Taipei City (TW)

(72) Inventor: Chang-Tai Lee, Taipei City (TW)

(73) Assignee: ASUSTeK COMPUTER INC., Taipei City (TW)

( * ) Notice: Subject to any disclaimer, the term of this patent is extended or adjusted under 35 U.S.C. 154(b) by 304 days.

(21) Appl. No.: 18/503,157

(22) Filed: Nov. 6, 2023

(65) Prior Publication Data

US 2024/0346619 A1     Oct. 17, 2024

(30) Foreign Application Priority Data

Apr. 14, 2023     (TW) ................................. 112113961

(51) Int. Cl.
*G06T 3/4053*     (2024.01)
*G06T 5/50*       (2006.01)
*G06T 5/70*       (2024.01)
*G06T 7/50*       (2017.01)
*G06V 10/56*      (2022.01)
*H04N 23/63*      (2023.01)

(52) U.S. Cl.
CPC .............. *G06T 3/4053* (2013.01); *G06T 5/50* (2013.01); *G06T 5/70* (2024.01); *G06T 7/50* (2017.01); *G06V 10/56* (2022.01); *H04N 23/632* (2023.01); *G06T 2207/10024* (2013.01); *G06T 2207/20221* (2013.01)

(58) Field of Classification Search
CPC ....... H04N 23/632; G06T 3/4053; G06T 7/50; G06T 5/70; G06T 5/50; G06T 2207/10024; G06T 2207/20221; G06V 10/56
See application file for complete search history.

(56) References Cited

U.S. PATENT DOCUMENTS 9,405,500 B1 *  8/2016  Cox ...................... G06F 1/1647
2017/0041553 A1   2/2017  Cao et al.
(Continued)

FOREIGN PATENT DOCUMENTS

CN        106231189       12/2016
CN        105657394       8/2018
CN        110572581       4/2021
(Continued)

*Primary Examiner* — Stephen R Koziol
*Assistant Examiner* — Raven Simone Jones
(74) *Attorney, Agent, or Firm* — JCIPRNET

(57) ABSTRACT

An image capturing device and a zooming method for a depth-of-field image thereof are disclosed. The method is adapted to the image capturing device including a first lens module and a second lens module, and includes the following steps. In response to a photographing instruction, a first image and a second image are acquired respectively by using the first lens module and the second lens module. A digital zoom processing is respectively performed on the first image and the second image to generate a first zooming image and a second zooming image. A depth-of-field composite processing is performed according to the first zooming image and the second zooming image to generate a zooming depth-of-field image. The zooming depth-of-field image is recorded in a photo gallery.

16 Claims, 6 Drawing Sheets

(56)         References Cited

U.S. PATENT DOCUMENTS

2019/0109998  A1      4/2019  Venkataraman et al.
2023/0247286  A1*     8/2023  Cui ........................ H04N 23/60
                                              348/207.99

FOREIGN PATENT DOCUMENTS

CN          111064895          2/2022
WO      WO-2021073331  A1  *   4/2021   ............. H04N 23/67

* cited by examiner

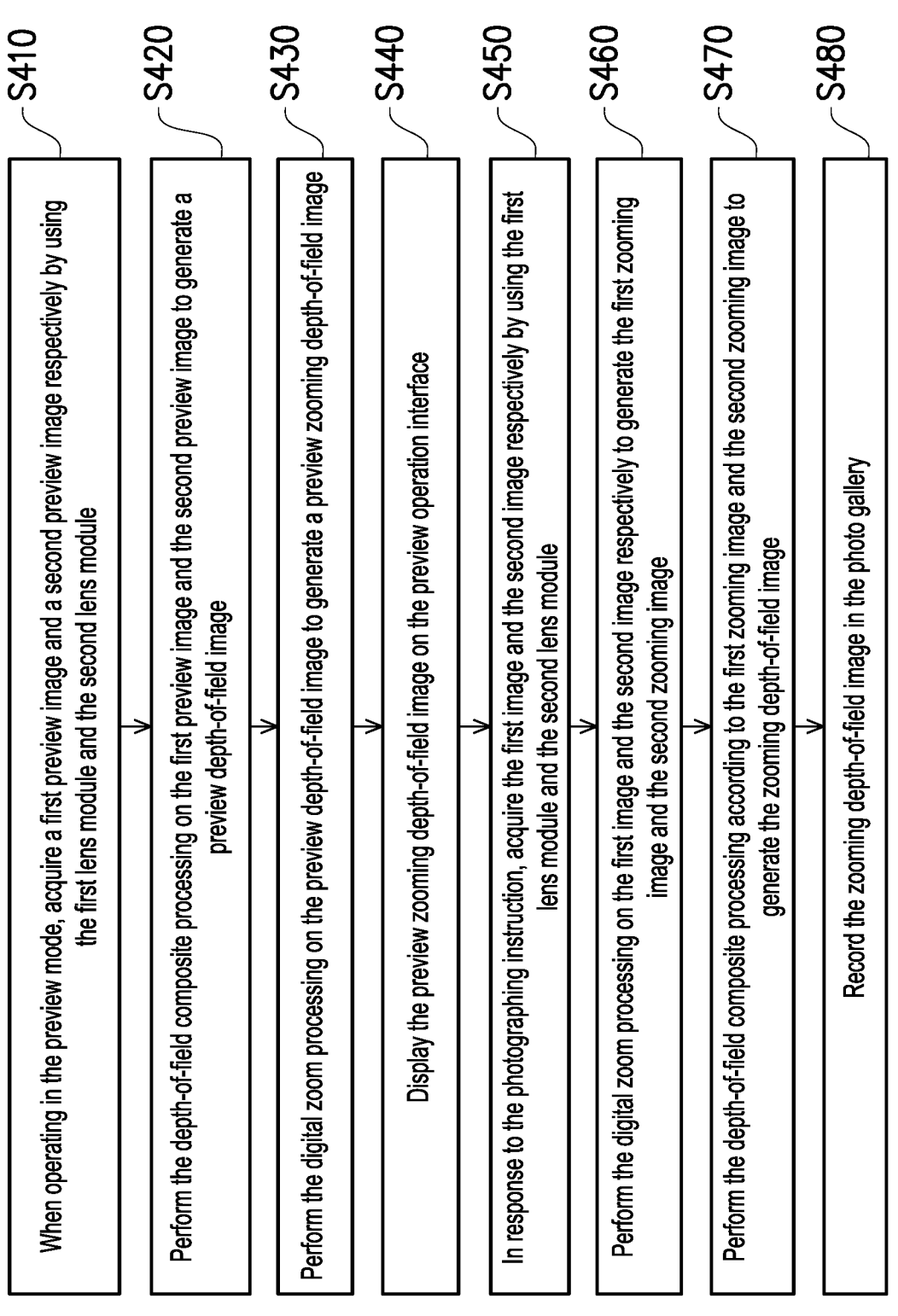

S410

When operating in the preview mode, acquire a first preview image and a second preview image respectively by using the first lens module and the second lens module

S420

Perform the depth-of-field composite processing on the first preview image and the second preview image to generate a preview depth-of-field image

S430

Perform the digital zoom processing on the preview depth-of-field image to generate a preview zooming depth-of-field image

S440

Display the preview zooming depth-of-field image on the preview operation interface

S450

In response to the photographing instruction, acquire the first image and the second image respectively by using the first lens module and the second lens module

S460

Perform the digital zoom processing on the first image and the second image respectively to generate the first zooming image and the second zooming image

S470

Perform the depth-of-field composite processing according to the first zooming image and the second zooming image to generate the zooming depth-of-field image

S480

Record the zooming depth-of-field image in the photo gallery

FIG. 4

IMAGE CAPTURING DEVICE AND ZOOMING METHOD FOR DEPTH-OF-FIELD IMAGE THEREOF

CROSS-REFERENCE TO RELATED APPLICATION

This application claims the priority benefit of Taiwan application serial no. 112113961, filed on Apr. 14, 2023. The entirety of the above-mentioned patent application is hereby incorporated by reference herein and made a part of this specification.

BACKGROUND

Technical Field

The disclosure relates to an image capturing device and a zooming method for a depth-of-field image.

Description of Related Art

With the advancement of technology, an image capturing device with photography functions have become indispensable and important items in modern people's lives. Nowadays, people are very accustomed to using captured images to record various events in their lives. In order to adapt to diverse shooting scenarios and acquire good image quality, the image capturing device may be equipped with multiple lenses with different functions. Under the condition of disposing the lenses, the image capturing device may acquire depth-of-field information in a scene to further generate a photo emphasizing a main subject with a depth-of-field effect. However, at present, when a user activates a depth-of-field function to capture an image, the user may often not use a zooming function at the same time. The user has to rely on movement of a photographer or a subject back and forth to achieve a zooming purpose and meet composition requirements.

SUMMARY

The disclosure provides a zooming method for a depth-of-field image adapted to an image capturing device including a first lens module and a second lens module. The method includes the following. In response to a photographing instruction, a first image and a second image are acquired respectively by using the first lens module and the second lens module. A digital zoom processing is performed on the first image and the second image respectively to generate a first zooming image and a second zooming image. A depth-of-field composite processing is performed according to the first zooming image and the second zooming image to generate a zooming depth-of-field image. The zooming depth-of-field image is recorded in a photo gallery.

The disclosure further provides an image capturing device, including a display device, a first lens module, a second lens module, a storage device, and a processor. The storage device records multiple instructions. The processor is coupled to the display device, the first lens module, the second lens module, and the storage device, and execute the instructions to perform the following. In response to a photographing instruction, a first image and a second image are acquired respectively by using the first lens module and the second lens module. A digital zoom processing is performed on the first image and the second image respectively to generate a first zooming image and a second zooming image. A depth-of-field composite processing is performed according to the first zooming image and the second zooming image to generate a zooming depth-of-field image. The zooming depth-of-field image is recorded in a photo gallery.

Based on the above, in the embodiments of the disclosure, when the user issues the photographing instruction, the digital zoom processing may be performed on the images captured by different lens modules first, and then the depth-of-field composite processing may be performed according to the zooming images to generate the zooming depth-of-field image. In this way, even if the image capturing device operates in the photographing mode that provides a depth-of-field function, it may still generate the zooming depth-of-field image with the special depth-of-field effect according to the zooming ratio required by the user. Compared to the conventional technology which may not provide a zooming function with any zooming ratios that may be fine-tuned by the user at supported ratios while operating in the photographing mode that provides the depth-of-field function, in the embodiments of the disclosure, the user may adjust the size of the subject in the photo with the special depth-of-field effect without moving the position, thereby significantly improving a shooting experience of photos with the special depth-of-field effect.

BRIEF DESCRIPTION OF THE DRAWINGS

FIG. 4 is a flowchart of a zooming method for a depth-of-field image according to an embodiment of the disclosure.

DETAILED DESCRIPTION OF DISCLOSED EMBODIMENTS

Figure 1:
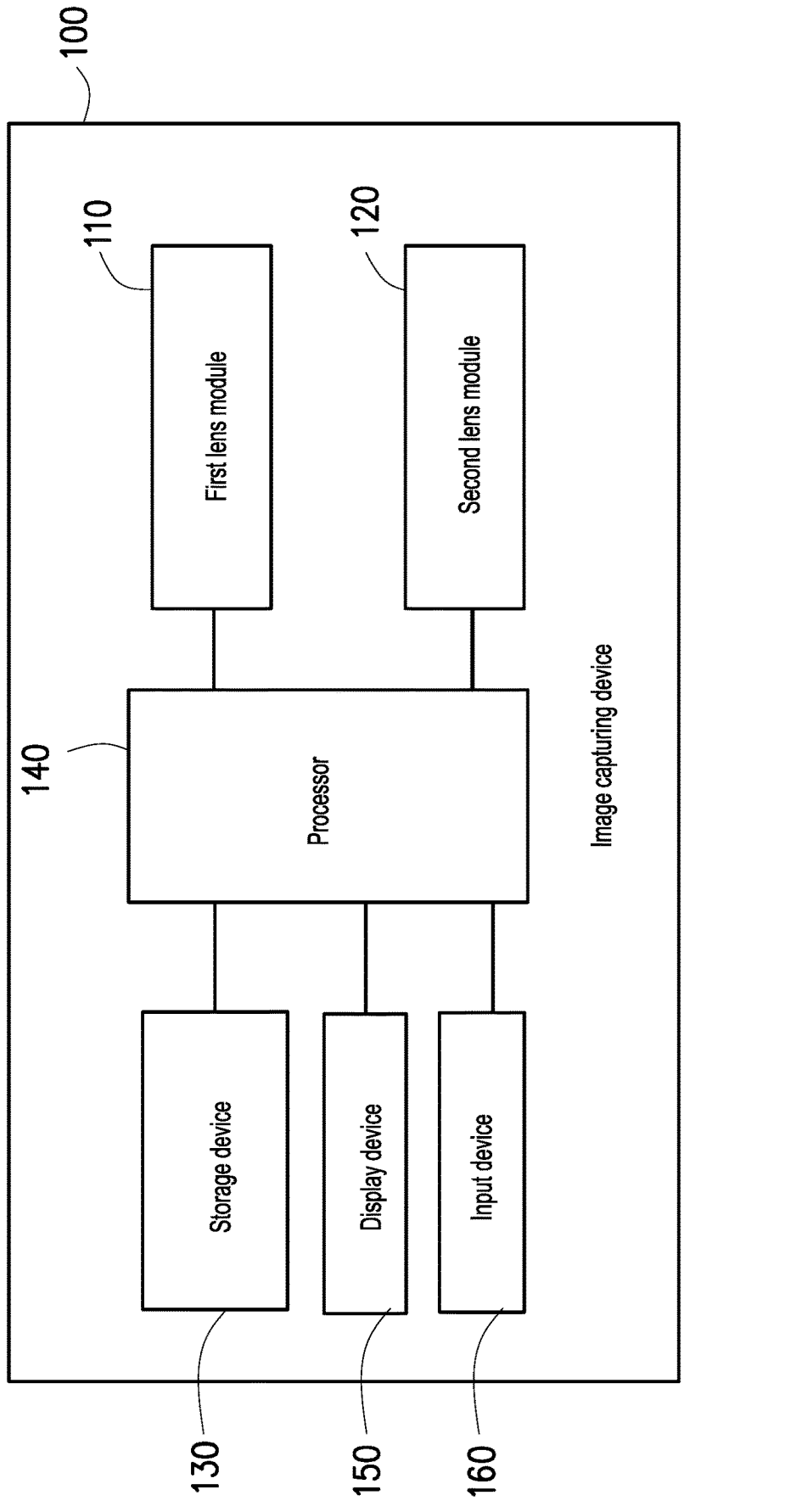
FIG. 1 is a schematic view of an image capturing device according to an embodiment of the disclosure.

Reference will now be made in detail to the exemplary embodiments of the disclosure, and examples of the exemplary embodiments are illustrated in the accompanying drawings. Whenever possible, the same reference numerals are used in the drawings and descriptions to indicate the same or similar parts. The embodiments are only a part of the disclosure and do not disclose all possible implementations of the disclosure. More precisely, the embodiments are merely examples of the device and the method in the claims of the disclosure.

Referring to FIG. 1, an image capturing device 100 in this embodiment is, for example, an electronic device with a photography function such as a smartphone, a tablet computer, a game console, a digital camera, and a notebook computer, but the disclosure is not limited thereto. The image capturing device 100 includes a first lens module 110, a second lens module 120, a storage device 130, a processor 140, a display device 150, and an input device 160. The processor 140 is coupled to the first lens module 110, the second lens module 120, the storage device 130, the display device 150, and the input device 160. Functions thereof are described separately as follows.

The first lens module 110 includes a first lens and a photosensitive element. The second lens module 120 includes a second lens and an image sensor. Photosensitive elements of the image sensor include, for example, a charge coupled device (CCD), a complementary metal-oxide semiconductor (CMOS) element, or other elements, but the disclosure is not limited thereto. The first lens and the second lens may respectively converge imaging light onto the corresponding image sensor to achieve a purpose of capturing an image. In addition, the first lens module 110 and the second lens module 120 may further respectively include an aperture and other elements.

In some embodiments, the image capturing device 100 includes at least two lens modules. A field of view (FOV) of the second lens module 120 may be different from a field of view of the first lens module 110. In some embodiments, the first lens module 110 may be a general wide-angle lens, while the second lens module 120 may be an ultra-wide-angle lens. In other embodiments, the first lens module 110 may be a telephoto lens, while the second lens module 120 may be the general wide-angle lens. In addition, in other embodiments, the first lens module 110 may be the telephoto lens, while the second lens module 120 may be the ultra-wide-angle lens.

The storage device 130 is configured to store data such as files, images, commands, program codes, and software modules, which may be, for example, any type of fixed or removable random access memory (RAM), read-only memory (ROM), flash memory, hard disk or other similar devices, integrated circuits, or a combination thereof.

The display device 150, is, for example, a liquid crystal display (LCD), a light-emitting diode (LED) display, a field emission display (FED), an organic light-emitting diode (OLED) display, or other types of displays, but the disclosure is not limited thereto.

The input device 160 is configured to receive user operations or user commands, which may be, for example, a touch input device, a keyboard, a button, a remote control, or other types of input devices. In some embodiments, the input device 160 and the display device 150 may be integrated into a touch screen, which may provide both display and input functions.

The processor 140, for example, is a central processing unit (CPU), an application processor (AP), other programmable general-purpose or special-purpose microprocessors, a digital signal processor (DSP), a programmable controller, an application specific integrated circuit (ASIC), a programmable logic device (PLD), a graphics processing unit (GPU), other similar devices, or a combination of these devices. The processor 140 may execute the program codes, the software modules, the commands, etc., stored in the storage device 130 to implement a zooming method for a depth-of-field image in this embodiment of the disclosure. The software modules may be broadly interpreted as meaning commands, command sets, codes, program codes, programs, applications, software packages, threads, processes, functions, etc.

Figure 2:
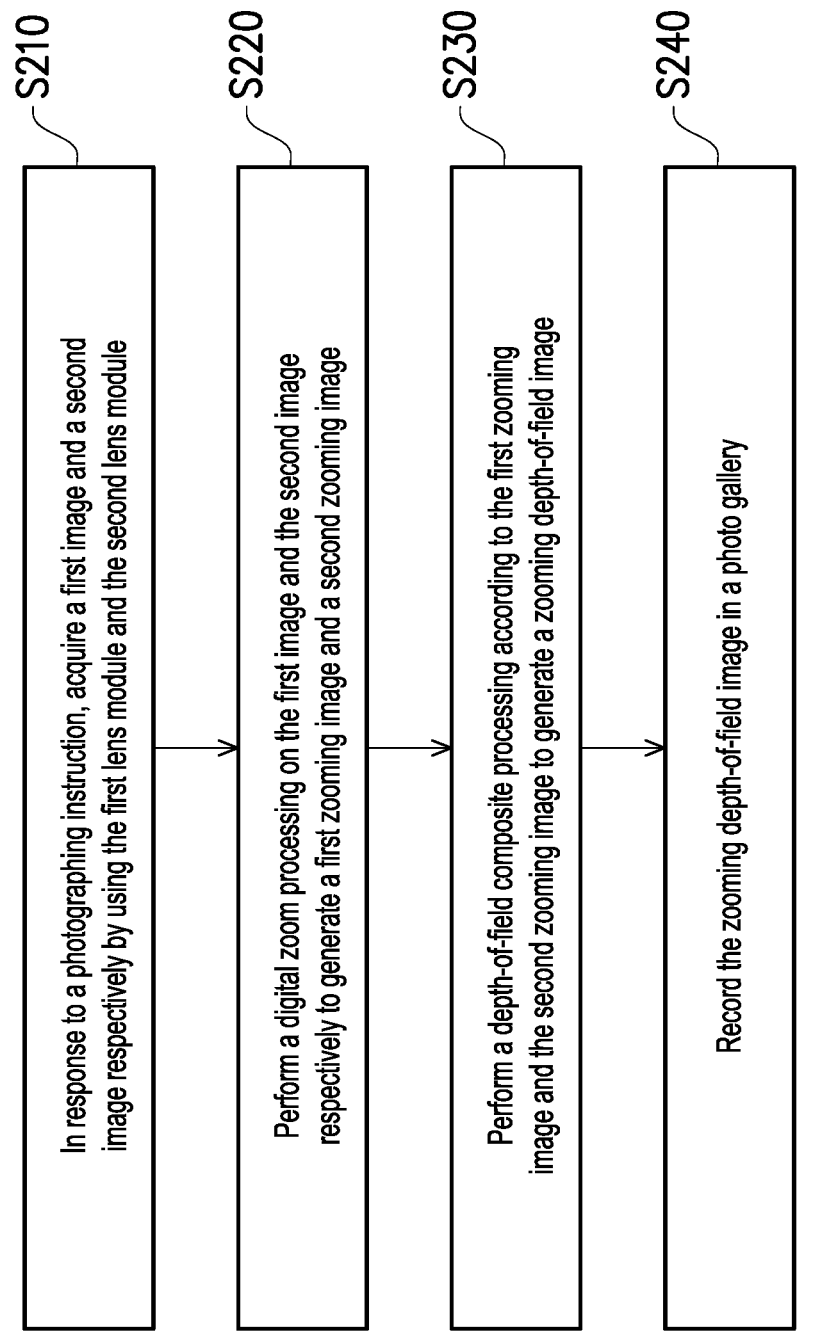
FIG. 2 is a flowchart of a zooming method for a depth-of-field image according to an embodiment of the disclosure.

Referring to FIG. 1 and FIG. 2, the method in this embodiment is adapted to the image capturing device 100 in the above embodiment. Detailed steps of the zooming method for the depth-of-field image in this embodiment will be described below with various elements in the image capturing device 100.

It should be noted that a user may control the image capturing device 100 to operate in a photographing mode (such as a portrait mode) that provides a depth-of-field effect, so that the image capturing device 100 captures an image with the depth-of-field effect.

In step S210, in response to a photographing instruction, the processor 140 acquires a first image and a second image respectively by using the first lens module 110 and the second lens module 120. Specifically, when operating in the photographing mode that provides the depth-of-field effect, the user may issue the photographing instruction through the input device 160, such as clicking on a virtual shutter button in a preview operation interface displayed on the display device 150. The first lens module 110 may capture one or more first images in response to the photographing instruction, and the second lens module 120 may capture one or more second images in response to the photographing instruction.

In step S220, the processor 140 performs a digital zoom processing on the first image and the second image respectively to generate a first zooming image and a second zooming image. Specifically, the processor 140 may perform the digital zoom processing on the first image to acquire the first zooming image correspondingly, and perform the digital zoom processing on the second image to acquire the second zooming image correspondingly. According to a zooming ratio set by the user and a selected shooting range, the processor 140 may perform an image cropping processing and an image scaling processing on the first image and the second image respectively to generate the first zooming image and the second zooming image. In some embodiments, the processor 140 may first acquire a first partial image from the first image through the image cropping processing, and then perform the image scaling processing on the first partial image to generate the first zooming image. Similarly, the processor 140 may generate the second zooming image according to the second image based on a similar process.

In some embodiments, the processor 140 may perform the digital zoom processing applying a super resolution algorithm on the first image according the zooming ratio to generate the first zooming image. In addition, the processor 140 may perform the digital zoom processing applying the super resolution algorithm on the second image according the zooming ratio to generate the second zooming image. In some embodiments, the zooming ratio is set according to the user operation in the preview mode, which will be more clearly described in subsequent embodiments.

It should be noted that the super resolution algorithm may be used to improve an image resolution. For example, after the first partial image within the first image is acquired, the processor 140 may perform a super resolution operation on the first partial image by applying one or more artificial intelligence (AI) models to generate the high-resolution first zooming image according to the first partial image. In addition, in some embodiments, after the image cropping processing is performed on the first images, the processor 140 may perform the super resolution algorithm according to multiple partial images to generate the high-resolution first zooming image. In this way, image quality after the digital zoom processing may be improved through the super resolution algorithm.

In some embodiments, the processor 140 may perform a color format conversion on the first image to generate a first format image. The processor 140 may perform the digital zoom processing applying the super resolution algorithm on the first format image according to the zooming ratio to generate the first zooming image. For example, the processor 140 may perform the color format conversion on the first image to generate the first format image with a format of YCbCr. Afterwards, the processor 140 may perform the digital zoom processing applying the super resolution algorithm on the first format image with the format of YCbCr.

In step S230, the processor 140 may perform a depth-of-field composite processing according to the first zooming image and the second zooming image to generate a zooming depth-of-field image. In some embodiments, the depth-of-field composite processing may include a Bokeh composite processing or the depth-of-field composite processing that provides other depth-of-field effects. In some embodiments, the zooming depth-of-field image includes a background blur image with a Bokeh effect. That is, the zooming depth-of-field image may be a background blur image with a clear subject.

In some embodiments, the processor 140 may acquire depth-of-field information according to the first zooming image and the second zooming image. That is, according to a depth estimation algorithm, the processor 140 may acquire the depth-of-field information according to the first zooming image and the second zooming image corresponding to different shooting angles, such as a depth map or other depth information. Afterwards, the processor 140 may generate the zooming depth-of-field image by using the depth-of-field information according to at least one of the first zooming image and the second zooming image. In some embodiments, the processor 140 may perform a background blurring processing on the first zooming image or the second zooming image according to the depth-of-field information to generate the zooming depth-of-field image. In addition, in some embodiments, the processor 140 may synthesize the first zooming image and the second zooming image according to the depth-of-field information to generate the zooming depth-of-field image.

Afterwards, in step S240, the processor 140 may record the zooming depth-of-field image in a photo gallery. In some embodiments, the processor 140 stores the zooming depth-of-field image in the storage device 130. From another perspective, the processor 140 stores the zooming depth-of-field image in a file system of the image capturing device 100. In addition, in some embodiments, the processor 140 may display the zooming depth-of-field image for viewing through the display device 150. In this way, in response to reception of the photographing instruction, the processor 140 may generate the zooming depth-of-field image with a special depth-of-field effect and after the digital zoom processing. A size of the subject in the zooming depth-of-field image with the special depth-of-field effect may be made to meet requirements of the user without moving the user or the subject.

Figure 3:
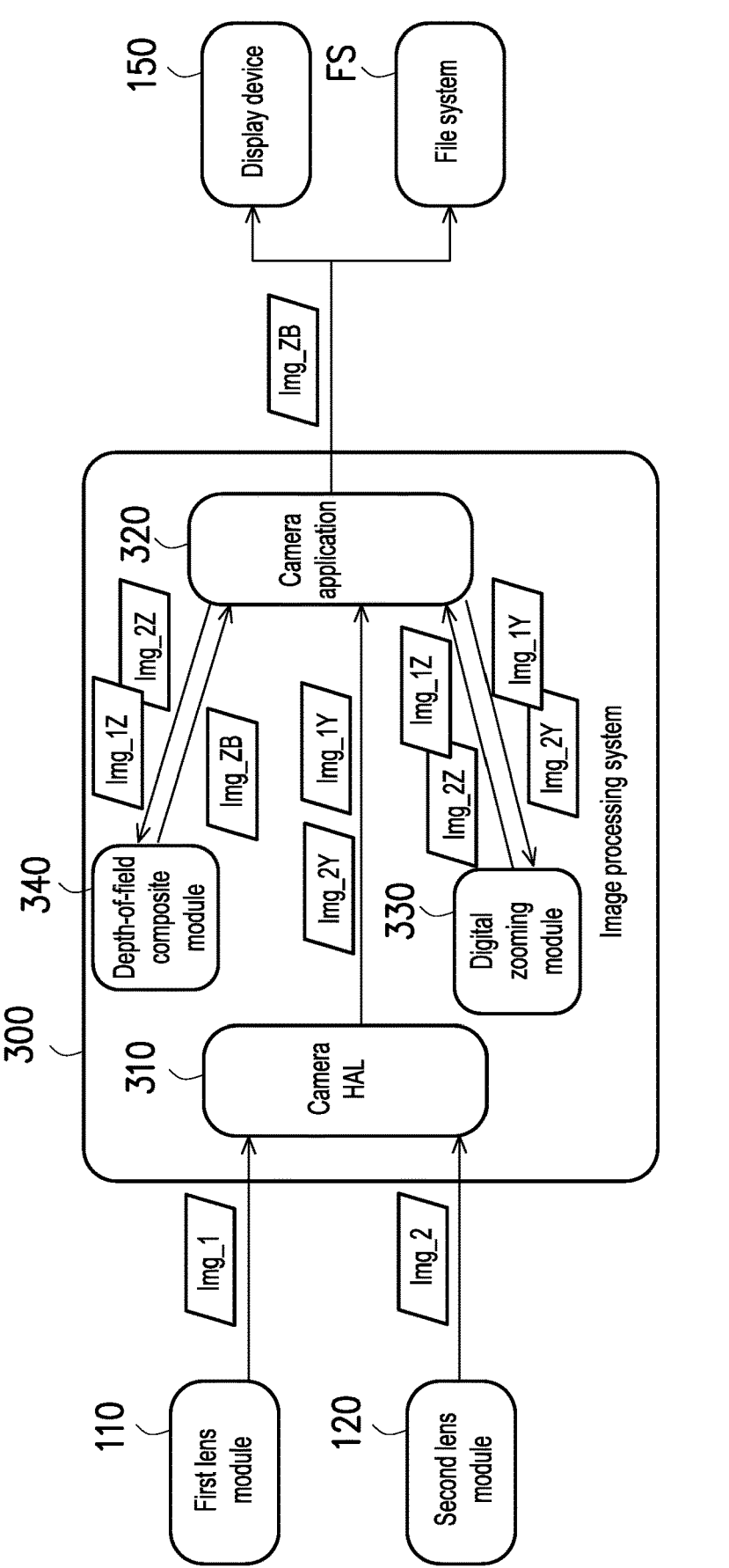
FIG. 3 is a schematic view of an operation of generating a zooming depth-of-field image in response to a photographing instruction according to an embodiment of the disclosure.

Referring to FIG. 3, the zooming method for the depth-of-field image in this embodiment may be implemented by executing the software modules through the processor 140. The software modules may include a camera hardware abstraction layer (HAL) 310, a camera application 320, a digital zooming module 330, and a depth-of-field composite module 340 in an image processing system 300.

The first lens module 110 captures a first image Img_1, and the second lens module 120 captures a second image Img_2. The camera HAL 310 performs the color format conversion on the first image Img_1 to generate a first format image Img_1Y. For example, the camera HAL 310 may perform the color format conversion on the first image Img_1 of an RGB format to generate the first format image Img_1Y with the format of YCbCr. Similarly, the camera HAL 310 performs the color format conversion on the second image Img_2 to generate a second format image Img_2Y. Afterwards, the camera HAL 310 may provide the first format image Img_1Y and the second format image Img_2Y to the camera application 320.

Next, the camera application 320 may perform the digital zoom processing applying the super resolution algorithm on the first format image Img_1Y by using the digital zooming module 330 to generate a first zooming image Img_1Z. Similarly, the camera application 320 may perform the digital zoom processing applying the super resolution algorithm on the second format image Img_2Y by using the digital zooming module 330 to generate a second zooming image Img_2Z. Afterwards, the camera application 320 may perform the depth-of-field composite processing according to the first zooming image Img_1Z and the second zooming image Img_2Z by using the depth-of-field composite module 340 to generate a zooming depth-of-field image Img_ZB. The camera application 320 may record the zooming depth-of-field image Img_ZB to a file system FS and transmit the zooming depth-of-field image Img_ZB to the display device 150 for display.

It should be noted that the actual zooming ratio used in a photographing operation may be set according to the user operation in the preview mode. In other words, in the preview mode, the user may set various zooming ratios through the input device 160, so as to refer to preview images corresponding to different zooming ratios in the preview operation interface to determine the actual target zooming ratio required for photographing. Therefore, when operating in the preview mode, the image capturing device 100 may provide a digitally zoomed preview image with the depth-of-field effect for the user to view through the display device 150. Embodiments are provided below to describe the disclosure clearly.

Referring to FIGS. 1 and 4, the method in this embodiment is adapted to the image capturing device 100 in the above embodiment. Detailed steps of the zooming method for the depth-of-field image in this embodiment will be described below with the various elements in the image capturing device 100.

It should be noted that when the user operates the camera application of the image capturing device 100, the display device 150 may display the preview operation interface of the camera application. The preview operation interface includes a preview screen and multiple control options, and the user may issue the user operation to the control options through the input device 160, so as to control the camera application to perform various functions, such as mode setting, photo parameter setting, or triggering photography. The user may view the preview image processed after the digital zoom processing and the depth-of-field composite processing through the preview operation interface to determine whether to issue the photographing instruction.

In step S410, when operating in the preview mode, the processor 140 acquires a first preview image and a second preview image respectively by using the first lens module 110 and the second lens module 120. In detail, when operating in the photographing mode that provides the depth-of-field effect, the first lens module 110 and the second lens module 120 continuously capture images in the preview mode. The first lens module 110 continuously captures the first preview image, and the second lens module 120 continuously captures the second preview image. The first preview image and the second preview image may be raw images generated by the first lens module 110 and the second lens module 120 respectively.

In step S420, the processor 140 performs the depth-of-field composite processing on the first preview image and the second preview image to generate a preview depth-of-field image. In some embodiments, the depth-of-field composite processing may include the Bokeh composite processing or the depth-of-field composite processing that provides other depth-of-field effects. In some embodiments, the preview depth-of-field image may be a background blur image with the Bokeh effect. In detail, according to the depth estimation algorithm, the processor 140 may acquire the depth-of-field information, such as the depth map or other depth information, according to the first preview image and the second preview image corresponding to different shooting angles. Afterwards, the processor 140 may generate the preview depth-of-field image by using the depth-of-field information according to at least one of the first preview image and the second preview image. The preview depth-of-field image may also be the background blur image with the Bokeh effect.

In step S430, the processor 140 performs the digital zoom processing on the preview depth-of-field image to generate a preview zooming depth-of-field image. In detail, according to the zooming ratio set by the user in the preview mode and the selected shooting range, the processor 140 may perform the image cropping processing and the image scaling processing respectively on the preview depth-of-field image to generate the preview zooming depth-of-field image. In some embodiments, the processor 140 may first acquire a partial image from the preview depth-of-field image through the image cropping processing, and then perform the image scaling processing on the partial image to generate the preview zooming depth-of-field image.

It should be noted that in some embodiments, when operating in the photographing mode that provides the depth-of-field effect, in the preview mode, the processor 140 may determine the zooming ratio of the digital zoom processing according to the user operation. For example, the user may set the zooming ratio by clicking on the control options in the preview operation interface or by using specific touch gestures. The processor 140 will provide the preview zooming depth-of-field image according to the zooming ratio set by the user.

In step S440, the processor 140 displays the preview zooming depth-of-field image on the preview operation interface through the display device 150. As a result, the user may view the preview image after the digital zoom processing and the depth-of-field composite processing in the preview mode to further determine a photo composition. After determining the zooming ratio, the user may issue the photographing instruction.

In step S450, in response to the photographing instruction, the processor 140 acquires the first image and the second image respectively by using the first lens module and the second lens module. In step S460, the processor 140 performs the digital zoom processing on the first image and the second image respectively to generate the first zooming image and the second zooming image. In step S470, the processor 140 performs the depth-of-field composite processing according to the first zooming image and the second zooming image to generate the zooming depth-of-field image. In step S480, the processor 140 records the zooming depth-of-field image in the photo gallery. Detailed operation methods of steps S450 to S480 have been clearly described in the previous text. Therefore, the same details will not be repeated in the following.

It should be noted that in the preview mode, the processor 140 first performs the depth-of-field composite processing and then performs the digital zoom processing. When capturing the image in response to the photographing instruction, the processor 140 first performs the digital zoom processing and then performs the depth-of-field composite processing. In this way, less image processing time may be spent in the preview mode, and the high-quality zooming depth-of-field image may be acquired when actually taking photos.

Figure 5:
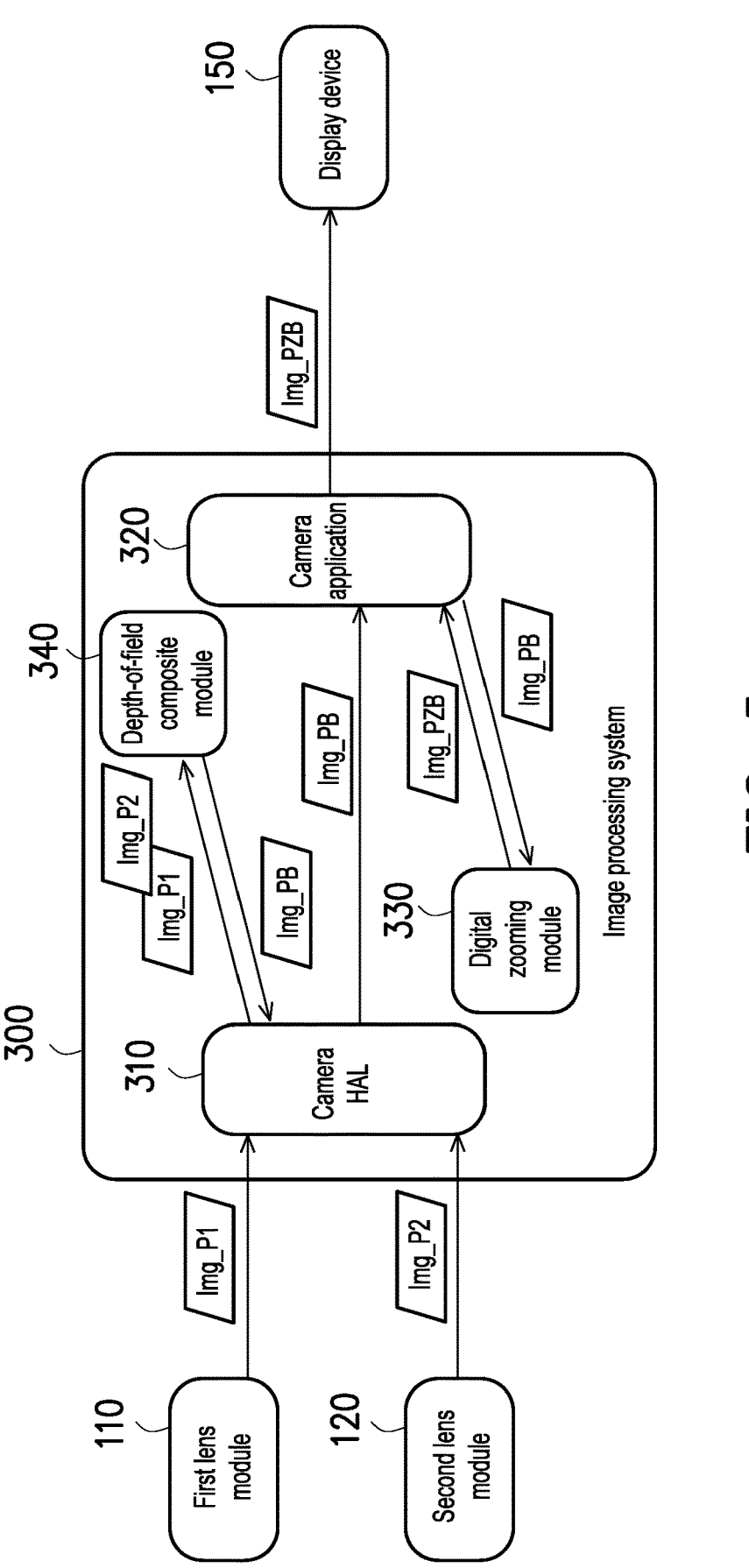
FIG. 5 is a schematic view of an operation of generating a preview zooming depth-of-field image in a preview mode according to an embodiment of the disclosure.

Referring to FIG. 5, the zooming method for the depth-of-field image in this embodiment may be implemented by executing the software modules through the processor 140. The software modules may include the camera hardware abstraction layer HAL 310, the camera application 320, the digital zooming module 330, and the depth-of-field composite module 340 in the image processing system 300. The camera hardware abstraction layer HAL 310, the camera application 320, the digital zooming module 330, and the depth-of-field composite module 340 may generate the zooming depth-of-field image recorded in the photo gallery according to the operation shown in FIG. 3. In addition, the camera hardware abstraction layer HAL 310, the camera application 320, the digital zooming module 330, and the depth-of-field composite module 340 may generate the preview zooming depth-of-field image in the preview mode according to the following description.

The first lens module 110 captures a first preview image Img_P1, and the second lens module 110 captures a second preview image Img_P2. The camera HAL 310 performs the depth-of-field composite processing according to the first preview image Img_P1 and the second preview image Img_P2 by using the depth-of-field composite module 340 to generate a preview depth-of-field image Img_PB. The camera HAL 310 provides the preview depth-of-field image Img_PB to the camera application 320. The camera application 320 performs the digital zoom processing on the preview depth-of-field image Img_PB by using the digital zooming module 330 to generate a preview zooming depth-of-field image Img_PZB. The camera application 320 may provide the preview zooming depth-of-field image Img_PZB to the display device 150 for displaying on the preview operation interface of the display device 150.

Figure 6:
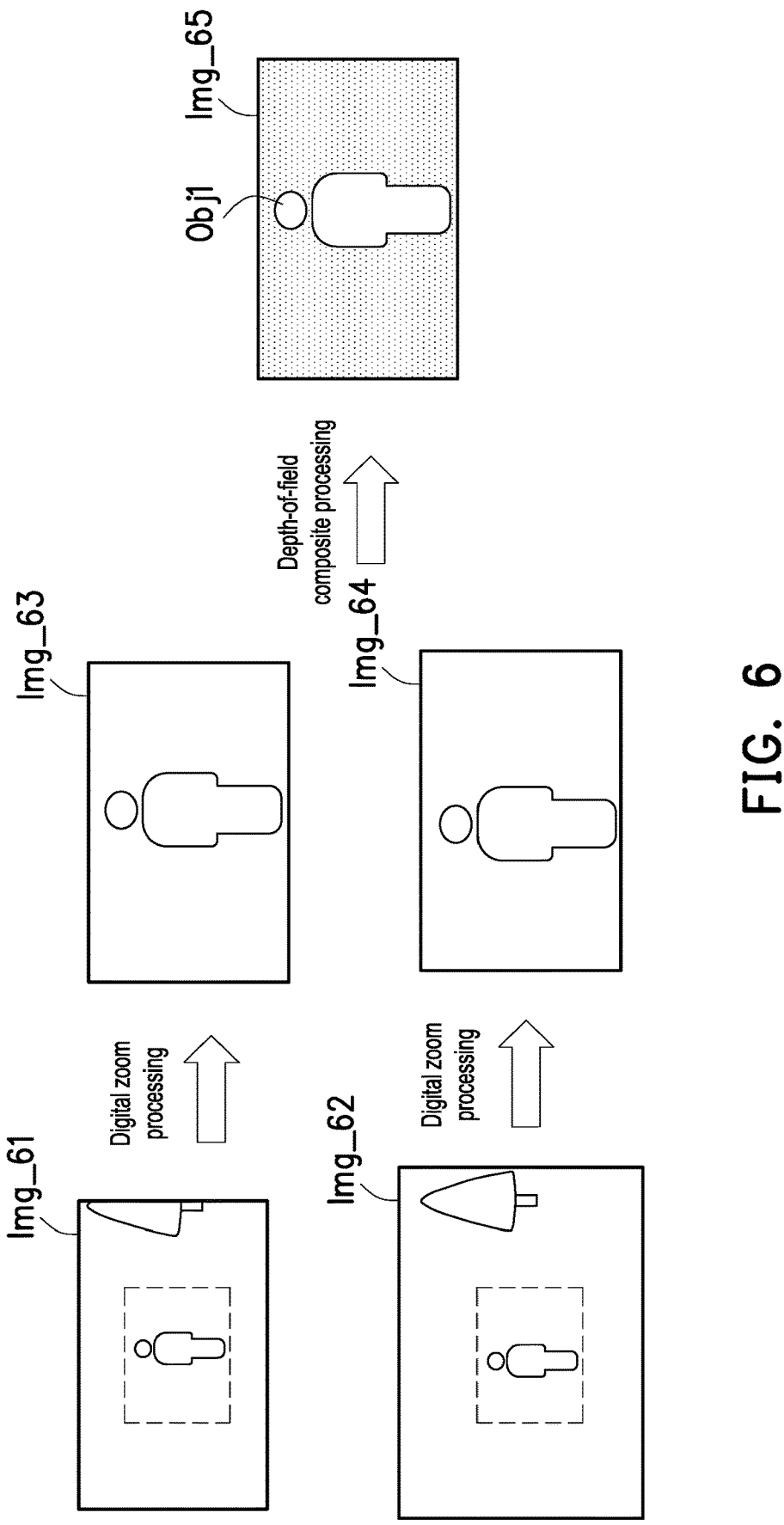
FIG. 6 is a schematic view of generating a zooming depth-of-field image according to an embodiment of the disclosure.

FIG. 6 is a schematic view of generating a zooming depth-of-field image according to an embodiment of the disclosure. Referring to FIG. 6, the processor 140 may acquire a first image Img_61 and a second image Img_62 through the first lens module 110 and the second lens module 120. After the digital zoom processing, the processor 140 may acquire a first zooming image Img_63 and a second zooming image Img_64. As shown in FIG. 6, the processor 140 may capture partial images respectively from the first image Img_61 and the second image Img_62 for a scaling processing and/or super resolution processing to generate the first zooming image Img_63 and the second zooming image Img_64. After the depth-of-field composite processing according to the first zooming image Img_63 and the second zooming image Img_64, the processor 140 may acquire a zooming depth-of-field image Img_65. In some embodiments, the processor 140 may generate the zooming depth-of-field image Img_65 through a Bokeh algorithm to generate the zooming depth-of-field image Img_65 in which a subject Obj1 is clear and the background is blurred.

Based on the above, in the embodiments of the disclosure, when the image capturing device operates in the preview mode, the depth-of-field composite processing may be performed on the images captured by different lens modules first, and then the digital zoom processing may be performed according to the preview depth-of-field image, so as to generate the preview image for displaying on the preview operation interface. The user may view the preview zooming depth-of-field image with the depth-of-field effect and corresponding to the zooming ratios in the preview mode without moving the position. When the user issues the photographing instruction, the digital zoom processing may be performed on the images captured by different lens modules first, and then the depth-of-field composite processing may be performed according to the zooming images to generate the zooming depth-of-field image. In this way, even if the image capturing device operates in the photographing mode that provides a depth-of-field function, it may still generate the zooming depth-of-field image with the special depth-of-field effect according to the zooming ratio required by the user. In this way, the user may acquire the depth-of-field image that meet the requirements through a very convenient operation method, thereby significantly improving a shooting experience of photos with the special depth-of-field effect.

Lastly, it is to be noted that: the embodiments described above are only used to illustrate the technical solutions of the disclosure, and not to limit the disclosure; although the disclosure is described in detail with reference to the embodiments, those skilled in the art should understand: it is still possible to modify the technical solutions recorded in the embodiments, or to equivalently replace some or all of the technical features; the modifications or replacements do not cause the essence of the corresponding technical solutions to deviate from the scope of the technical solutions of the embodiments.

What is claimed is:

1. A zooming method for a depth-of-field image adapted to an image capturing device comprising a first lens module and a second lens module, wherein the method comprises: in response to a photographing instruction, acquiring a first image and a second image respectively by using the first lens module and the second lens module; performing a digital zoom processing on the first image and the second image respectively to generate a first zooming image and a second zooming image, wherein performing the digital zoom processing on the first image and the second image comprises: according to a zooming ratio, performing the digital zoom processing applying a super resolution algorithm on the first image to generate the first zooming image by using one or more artificial intelligence models; performing a depth-of-field composite processing according to the first zooming image and the second zooming zoomed image to generate a zooming depth-of-field image; and recording the zooming depth-of-field image in a photo gallery.

2. The zooming method for the depth-of-field image according to claim 1, wherein the method further comprises:
when operating in a preview mode, acquiring a first preview image and a second preview image respectively by using the first lens module and the second lens module;
performing the depth-of-field composite processing according to the first preview image and the second preview image to generate a preview depth-of-field image;
performing the digital zoom processing on the preview depth-of-field image to generate a preview zooming depth-of-field image; and
displaying the preview zooming depth-of-field image on a preview operation interface.

3. The zooming method for the depth-of-field image according to claim 2, wherein the method further comprises:

in the preview mode, determining a zooming ratio of the digital zoom processing according to a user operation.

4. The zooming method for the depth-of-field image according to claim 1, wherein performing the digital zoom processing on the first image and the second image respectively to generate the first zooming image and the second zooming image further comprises:
according to the zooming ratio, performing the digital zoom processing applying the super resolution algorithm on the second image to generate the second zooming image.

5. The zooming method for the depth-of-field image according to claim 4, wherein the zooming ratio is set in a preview mode according to a user operation.

6. The zooming method for the depth-of-field image according to claim 4, wherein according to the zooming ratio, performing the digital zoom processing applying the super resolution algorithm on the first image to generate the first zooming image comprises:
performing a color format conversion on the first image to generate a first format image; and
according to the zooming ratio, performing the digital zoom processing applying the super resolution algorithm on the first format image to generate the first zooming image,
wherein according to the zooming ratio, performing the digital zoom processing applying the super resolution algorithm on the second image to generate the second zooming image comprises:
performing the color format conversion on the second image to generate a second format image; and
according to the zooming ratio, performing the digital zoom processing applying the super resolution algorithm on the second format image to generate the second zooming image.

7. The zooming method for the depth-of-field image according to claim 1, wherein performing the depth-of-field composite processing according to the first zooming image and the second zooming image to generate the zooming depth-of-field image comprises:
acquiring depth-of-field information according to the first zooming image and the second zooming image; and
according to at least one of the first zooming image and the second zooming image, generating the zooming depth-of-field image by using the depth-of-field information.

8. The zooming method for the depth-of-field image according to claim 7, wherein the zooming depth-of-field image comprises a background blur image with a Bokeh effect.

9. An image capturing device, comprising:
a display device;
a first lens module;
a second lens module;
a storage device recording a plurality of instructions;
a processor coupled to the display device, the first lens module, the second lens module, and the storage device, and executing the instructions and configured to:
in response to a photographing instruction, acquire a first image and a second image respectively by using the first lens module and the second lens module;
perform a digital zoom processing on the first image and the second image respectively to generate a first zooming image and a second zooming image, wherein the processor is further configured to perform, according to a zooming ratio, the digital zoom processing applying a super resolution algorithm on the first image to generate the first zooming image by using one or more artificial intelligence models;

perform a depth-of-field composite processing according to the first zooming image and the second zooming image to generate a zooming depth-of-field image; and record the zooming depth-of-field image in a photo gallery.

10. The image capturing device according to claim 9, wherein the processor is further configured to:

when operating in a preview mode, acquire a first preview image and a second preview image respectively by using the first lens module and the second lens module;

perform the depth-of-field composite processing according to the first preview image and the second preview image to generate a preview depth-of-field image;

perform the digital zoom processing on the preview depth-of-field image to generate a preview zooming depth-of-field image; and display the preview zooming depth-of-field image on a preview operation interface.

11. The image capturing device according to claim 10, wherein the processor is further configured to:

in the preview mode, determine a zooming ratio of the digital zoom processing according to a user operation.

12. The image capturing device according to claim 9, wherein the processor is further configured to:

according to the zooming ratio, performing the digital zoom processing applying the super resolution algorithm on the second image to generate the second zooming image.

13. The image capturing device according to claim 12, wherein the zooming ratio is set in a preview mode according to a user operation.

14. The image capturing device according to claim 9, wherein the processor is further configured to:

perform a color format conversion on the first image to generate a first format image;

according to the zooming ratio, perform the digital zoom processing applying the super resolution algorithm on the first format image to generate the first zooming image, perform the color format conversion on the second image to generate a second format image; and according to the zooming ratio, perform the digital zoom processing applying the super resolution algorithm on the second format image to generate the second zooming image.

15. The image capturing device according to claim 9, wherein the processor is further configured to:

acquire depth-of-field information according to the first zooming image and the second zooming image; and according to at least one of the first zooming image and the second zooming image, generate the zooming depth-of-field image by using the depth-of-field information.

16. The image capturing device according to claim 15, wherein the zooming depth-of-field image comprises a background blur image with a Bokeh effect.

* * * * *